United States Patent
Rajan et al.

(10) Patent No.: US 11,587,414 B2
(45) Date of Patent: Feb. 21, 2023

(54) GEO-LOCKED FIELD DEVICE

(71) Applicant: Honeywell International Inc., Charlotte, NC (US)

(72) Inventors: Giridhar Rajan, Bangalore (IN); Arun Mahasenan, Plymouth (MN); Jitendra Acharya, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/136,791

(22) Filed: Dec. 29, 2020

(65) Prior Publication Data

US 2021/0158673 A1 May 27, 2021

Related U.S. Application Data

(63) Continuation of application No. 16/691,955, filed on Nov. 22, 2019, now Pat. No. 10,943,448.

(51) Int. Cl.
| | |
|---|---|
| *A45C 13/18* | (2006.01) |
| *G08B 13/14* | (2006.01) |
| *H04W 4/021* | (2018.01) |
| *H04W 48/04* | (2009.01) |
| *H04W 4/02* | (2018.01) |
| *H04W 4/029* | (2018.01) |
| *H04W 4/80* | (2018.01) |

(52) U.S. Cl.
CPC ....... *G08B 13/149* (2013.01); *G08B 13/1436* (2013.01); *H04W 4/021* (2013.01); *H04W 4/023* (2013.01); *H04W 4/025* (2013.01); *H04W 4/029* (2018.02); *H04W 4/80* (2018.02); *H04W 48/04* (2013.01)

(58) Field of Classification Search
None
See application file for complete search history.

(56) References Cited

U.S. PATENT DOCUMENTS

| 4,284,983 A | * | 8/1981 | Lent ................... G08B 13/1409 340/687 |
| 4,297,075 A | * | 10/1981 | Jacobs .................. F03D 7/0216 416/14 |
| 6,166,688 A | | 12/2000 | Cromer et al. |
| 8,248,237 B2 | | 8/2012 | Fitzgerald et al. |

(Continued)

FOREIGN PATENT DOCUMENTS

EP    2503810 A1    9/2012

OTHER PUBLICATIONS

Kaiman, "China's Heralded 'solar highway' Closed after thieves stole one of the panels," LA Times, 3 pages, Jan. 9, 2018.

(Continued)

*Primary Examiner* — Brent Swarthout
(74) *Attorney, Agent, or Firm* — Seager, Tufte & Wickhem LLP

(57) ABSTRACT

A geo-locked field device that is situated in a non-moving position and is operable as long as its position, including altitude and direction, is unchanged. If the position of the device is changed or disturbed, then the device will become inoperable. If the position is returned to its former position after being disturbed and rendered inoperable, then the device will continue to be inoperable. Providing a special signal to the device may cause it to become operable.

6 Claims, 3 Drawing Sheets

(56) References Cited

U.S. PATENT DOCUMENTS

| | | |
|---|---|---|
| 8,522,043 B2 | 8/2013 | Duffus et al. |
| 8,542,833 B2 | 9/2013 | Devol et al. |
| 2004/0203895 A1 | 10/2004 | Balasuriya |
| 2006/0244577 A1 | 11/2006 | Tanaka et al. |
| 2008/0083982 A1 | 4/2008 | Kelley et al. |
| 2008/0313725 A1 | 12/2008 | Thiagarajan |
| 2009/0009283 A1 | 1/2009 | Arts |
| 2009/0085760 A1* | 4/2009 | Lee .................... G08B 13/1472 340/665 |
| 2010/0218012 A1* | 8/2010 | Joseph .................... G06F 21/88 726/34 |
| 2012/0124388 A1 | 5/2012 | Chng et al. |
| 2016/0157100 A1 | 6/2016 | Soderblom |
| 2017/0078873 A1 | 3/2017 | Ferren et al. |
| 2019/0373998 A1* | 12/2019 | Knittel .................... G08B 5/36 |

OTHER PUBLICATIONS

Vijay, "Solar Panels And Batteries Are Among Stolen From Eastern Peripheral Expressway," 4 pages, Jun. 16, 2018.

\* cited by examiner

STEPS DURING INSTALLATION

1. Install Field Device
2. Use Handheld Device to enable Geo-Locking
3. Verify the working for field device in Geo-Locked position
4. Verify Remote Communication with Field Device
5. Move the field device from its Geo-Locked position
6. Verify that the field device has stopped working upon movement
7. Unlock field device through remote communication
8. Re-install field device in desired position
9. Lock the field device using handheld device

Figure 3

GEO-LOCKED FIELD DEVICE

This application is a Continuation of U.S. patent application Ser. No. 16/691,955, filed Nov. 22, 2019. Continuation of U.S. patent application Ser. No. 16/691,955, filed Nov. 22, 2019, is hereby incorporated by reference.

BACKGROUND

The present disclosure pertains to security of equipment, particularly devices in areas remote from an environment of electronic contact or communication.

SUMMARY

The disclosure reveals a geo-locked field device that is situated in a non-moving position and is operable as long as its position, including altitude and direction, is not changed or disturbed. If the position of the device is changed or disturbed, then the device will become inoperable. If the position is returned to its former position after being disturbed and rendered inoperable, then the device will continue to be inoperable. Providing a special signal to the device may cause it to become operable.

BRIEF DESCRIPTION OF THE DRAWING

FIG. 3 is a diagram of steps for an installation of the present geo-locking field device.

DESCRIPTION

Figure 1:
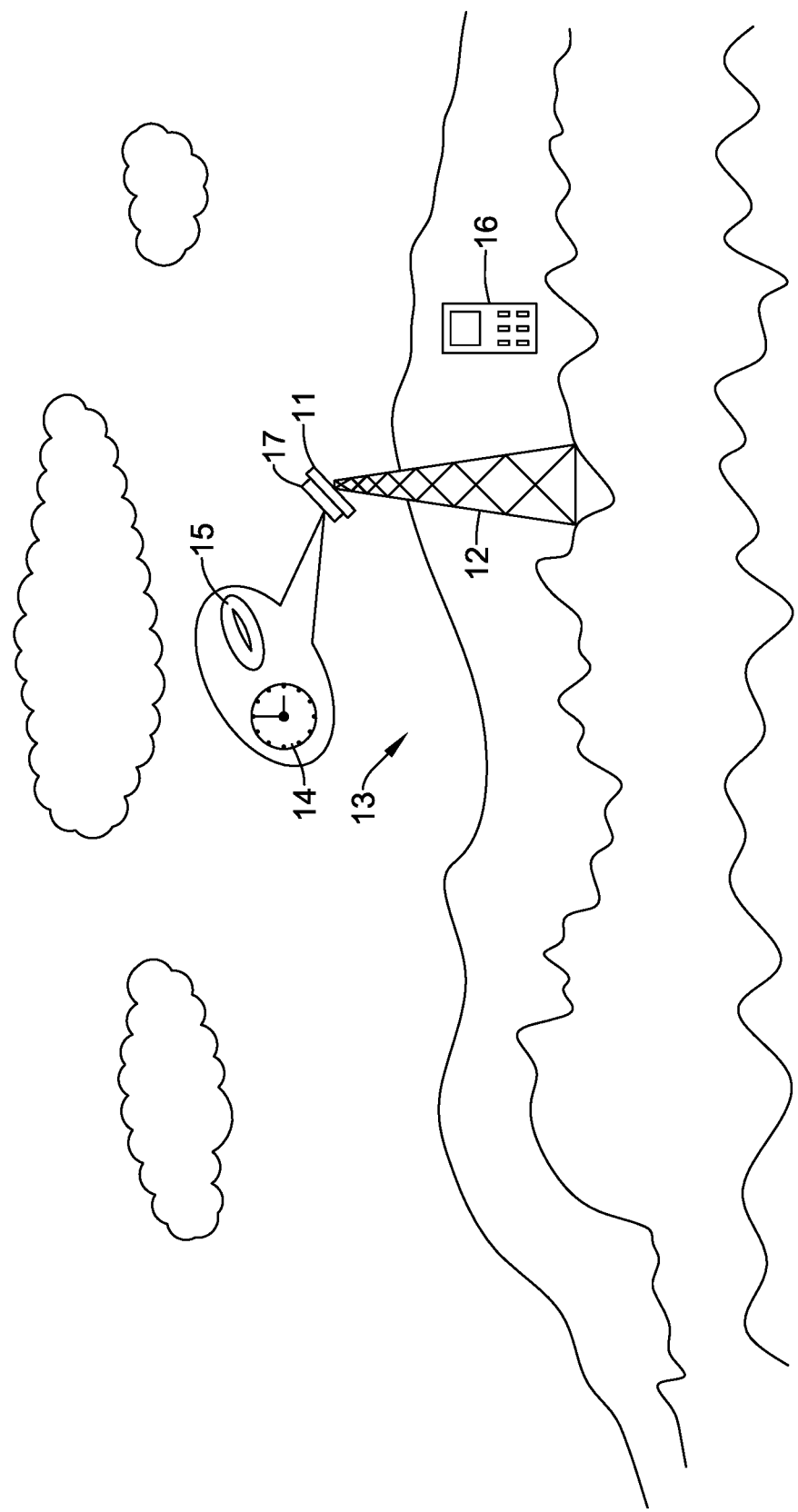
FIG. 1 is a diagram of a device with sensors that can detect change in position or direction of the device.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Field devices such as closed circuit television (CCTV) cameras may be supplied to governments of various countries. These field devices may be often used in remote locations. An issue is a frequent theft of field devices. Although several attempts have been made in the past to prevent theft, it appears not practically possible to protect field assets from being stolen from all locations at all times. The costs incurred in securing these assets can be very high.

An issue is that field devices, such as CCTV cameras and solar panels installed in remote locations and highways, may get stolen. It appears practically impossible to always protect field assets everywhere. This solution may dis-incentivize stealing of field devices by making them non-functional if they are moved to another location.

The present system and solution may dis-incentivize stealing of field assets such as CCTV cameras, solar panels, or any other assets. An idea is to electronically lock the field device if it's stolen and used at another location. This asset protection feature may add great value to customers, especially governments, who use products in large scale in outdoor locations as part of city surveillance and smart city projects where physical monitoring is not practicable. The idea may also be expanded as a solution to third party field devices, the most popular ones being solar panels. It may be noted that solar panels installed in the highways of India as well as China recently have been said to be stolen within a couple weeks of installation.

One factor of third party discouragement is naming the present system as "geo-locking technology", meaning, that the field device may work only in the location where it was initially installed and may fail to operate and will sound an alarm if an attempt is made to use it in a different location. To achieve geo-locking, the field device may have a built-in magnetometer and altimeter. Other sensors may be built into the field device.

After initial installation, a remote controller may command the field device to record its own direction and altitude using the built-in magnetometer and altimeter. Two advantages of using this technique are: 1) This approach has dual location information stored in it which is difficult to replicate if stolen and attempted to be used in another location; and 2) This approach does not necessarily rely on Internet or GPS which may often not be available in remote locations where field devices are used.

The system may have a software component. It may have a stack level sensor, that is, a hardware device with some embedded software for detecting, measuring and transmitting data (e.g., altitude or direction). The software may be embedded in that it can run in a device or unit (e.g., firmware). A significant feature is that the system is geo-Locking without external dependency.

Another feature is that system may be a device which self-monitors a change of environment from its intended environment using a parameter or a combination of parameters such as altitude, vibration, the earth's magnetic field, and/or other parameters. Upon such change of environment, the device may become non-functional. Self-theft detection and theft discouragement or disincentivization of field devices may let the devices be installed in locations without any dependency on external wireless or wired signals.

The system may be a device that has remote unlocking upon availability of wireless connectivity such as Wi-Fi, Bluetooth or a cellular network. Upon accidental locking of the device, the device may be unlocked using wireless or wire connectivity of a handheld device.

The field device may identify itself and transmit its location using wireless connectivity such as GPS, Bluetooth, WIFI or cellular network signals, depending on the area of usage. For instance, upon theft, the initial and subsequent locations of the device may be identified. Thus, locations of movable devices within controlled environments such as offices and hospitals may be identified.

One specified example of the system may be a field device having a built-in magnetometer and an altimeter. After installation, a handheld tool geo-locker may be used to program and/or operate the field device. If the direction or altitude of the field device changes, then the field device may stop working. Vibration of the device may affect the altitude or direction of the device thus causing it to cease operability.

A company may make field devices such as CCTV cameras or solar panels and integrate significant knowledge of magnetometer and altimeter technology with camera or solar panel technology to result in the present system. A market size of the present system may be as large as the market size of, for example, field cameras or solar panels. Other kinds of devices incorporating the system may also reflect large markets The present system may have dual location information stored in it which is difficult to extract or replicate if the system is stolen and attempted to be used in another location. The present system or approach does not necessarily rely on the interne or GPS which may be often unavailable in remote locations where field devices are used.

FIG. 1 is a diagram that illustrates an aspect of the present system. For an example, a field device may be a CCTV camera 11 positioned on a tower 12 for viewing a landscape 13. Electronics 17 associated with or integrated in camera 11 may include an altimeter 14 that indicates an elevation of camera 11 below or above a reference point such as sea level, and a magnetic compass 15 that indicates a direction of camera 11 relative to a reference point such as north. When installation of camera 11 is complete, the electronics may store the current altitude and direction of camera 11. Storage of altitude and direction may be effected with a handheld device 16 that can command camera 11 via electronics 17 to perform such storage. After that, camera 11 may perform its function of obtaining video of landscape 13 within a field of view of camera 11. If some person or other disturbance comes along and moves or disturbs camera 11 such that the altitude or direction of camera 11 is changed, such change may be detected when a comparison is made of readings of altitude and direction with the altitude and direction stored in a memory of the associated electronics 17. Upon such detection, camera 11 may be shut down in a way that reviving camera functions is very difficult and costly, such as disassembly and analysis of the present system, thus making a theft or misappropriation of camera 11 of virtually no value to a perpetrator of the movement or disturbance of camera 11 in the event that the perpetrator successfully takes camera 11. Even a high volume of successful misappropriations of cameras 11, solar panels or other kinds of devices with the present system would not necessarily prove to be beneficial to the perpetrator.

Figure 2:
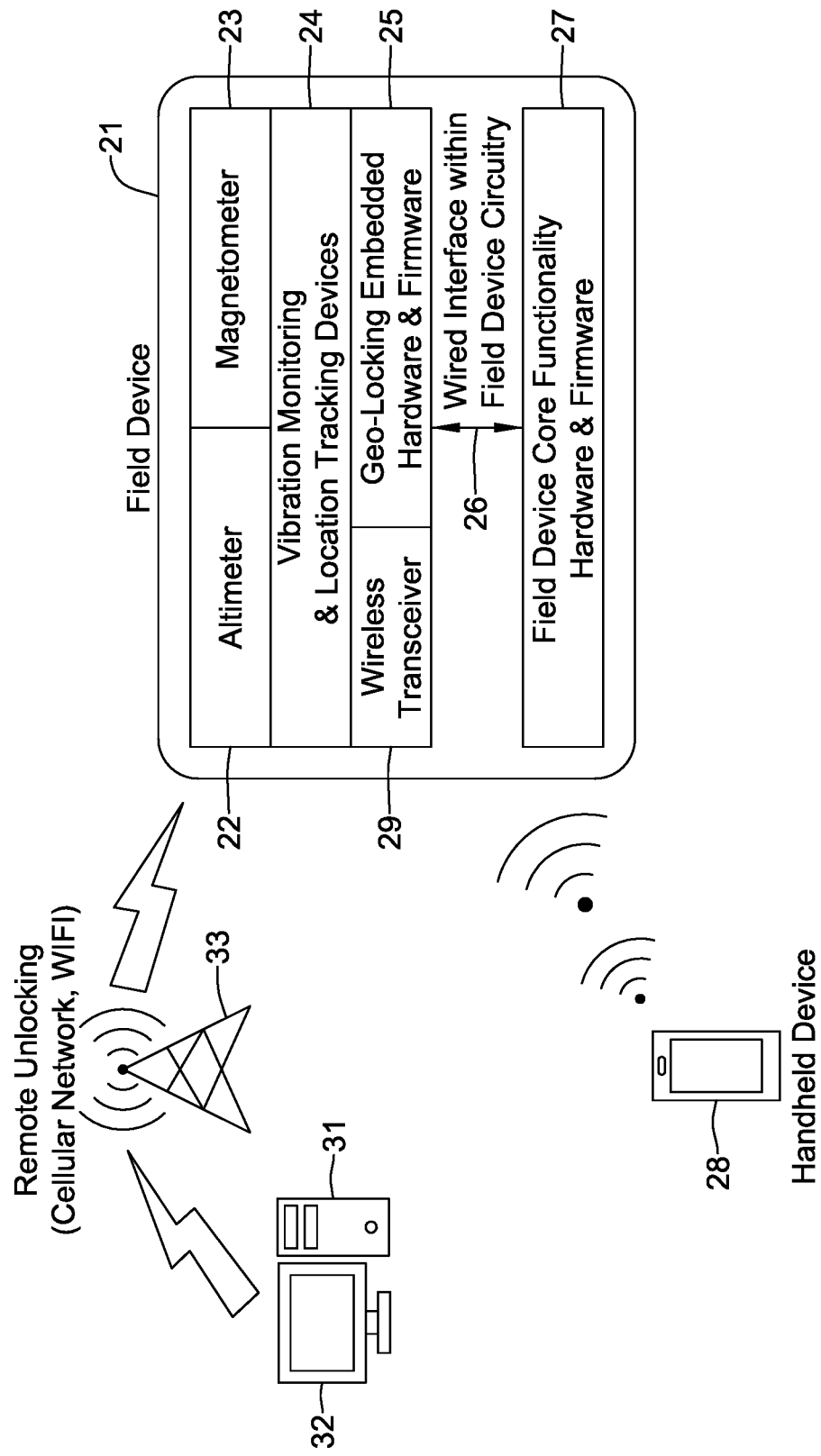
FIG. 2 is a diagram of a geo-locking field device and associated components.

FIG. 2 is a diagram relating to geo-locking field devices. A field device 21 may incorporate various sensing and communication mechanisms. There may be an altimeter 22 for indicating height of device 21relative to sea level or some other reference point or level. There may be a magnetometer 23 that can detect direction and a magnetic field influence in the environment or of certain magnetic affecting objects at its location. Also, device 21 may have a vibration monitoring and location tracking device 24 which can sense movement or tampering of device 21. There may be geo-locking embedded hardware and firmware 25 which has a wired interface within field device circuitry 26 having field device core functionality hardware and firmware 27.

One or more handheld devices 28 may communicate with a wireless transceiver 29 of field device 21. A cell phone or other handheld devices 31, and desktop computers 32 may communicate via wireless equipment, such as towers 33 or other equipment to perform various actions, for example, remote unlocking, or the like, with various media involving cellular networks, WIFI, and so forth, in conjunction with wireless transceiver 29 of field device 21.

To establish an installation of the present field device 21, a list 35 of various steps may be taken as shown in FIG. 3, for example, the following items: 1) Install a field device; 2) Use a handheld device to enable geo-locking; 3) Verify the working for the field device in geo-locked position; 4) Verify remote communication with field device; 5) Move the field device from its geo-locked position; 6) Verify that the field device has stopped working upon movement; 7) Unlock field device through remote communication; 8) Re-install field device in desired position; and 9) Lock the field device using handheld device.

To recap, a disabling mechanism for a field device, may incorporate a first sensor, and an electronics module connected in an integrated fashion to the first sensor. The first sensor may detect an altitude of a field device. A change in altitude detected by the first sensor may result in the electronics module to engage a disabling function of the field device, which results in a shutdown of the field device.

The field device may further incorporate a second sensor connected to the electronics module. The second sensor may detect a direction of the field device. A change in direction detected by the second sensor of the field sensor may result in the electronics module engaging a disabling of the field device, which results in a shutdown of the field device, without a change in altitude detected by the first sensor.

A design of the electronics module may prevent rehabilitation of the field device even if the field device is returned to an altitude and a direction that are the same as the altitude and direction that the field device had before any change in altitude or change in direction.

The design of the electronics may permit a signal to be sent or reflected by a handheld component to reverse the disabling of the field device and revive the field device to an operational state that it had prior to a change in altitude or direction of the field device.

When the reverse of the disabling of the field device occurs, the field device may be revived in an altitude and direction different than a previous altitude and direction that the field device had prior to a change of altitude and direction.

The altitude and direction of the field device at the time of revival may be stored and used as a reference for detecting another change in altitude or direction of the field device leading to a disabling of the field device, which results in a shutdown of the field device.

The design of the electronics module may permit a signal to be sent or reflected by a portable component, if in an environment of wireless connectivity selected from a group comprising Wi-Fi, Bluetooth, GPS, and cellular networks, to remotely unlock or reverse the disabling of the field device and revive the field device to an operational state that it had prior to the change in altitude or direction of the field device.

The design of the electronics module may permit the field device to transmit a signal that identifies itself or its location in an environment of wireless connectivity selected from a group comprising Wi-Fi, Bluetooth, GPS, and cellular networks.

An approach for disabling a device upon a parameter disturbance of the field device, may incorporate performing a first measurement of a parameter of a device, performing a second measurement of the parameter of the device, and comparing the second measurement with the first measurement. If the second measurement is different from the first measurement, then the device may be disabled and continue to be disabled even if a third measurement or a more subsequent measurement is the same as the first measurement.

A disablement of the device may cause the device to become irreversibly non-functional to anyone without special equipment designed to revive functionality of the device.

The first, second and subsequent measurements may be of altitude.

The first, second and subsequent measurements may be of direction.

The first, second and subsequent measurements may be of altitude and direction.

The parameter may be location. Location of an initial placement of the device may be recorded by the device. Deviation of location of the device from the location of the initial or intended placement, as recorded, of the device may cause the device to be disabled or turn on an alarm.

The device may receive a code to be enabled from a disabled state.

The parameter may be a pre-determined amount magnitude of vibration that is exceeded to cause the device to become disabled.

A mechanism for locking a field device to a particular geographic location may be an electronics module having a connector for attaching a field device. The electronics module may incorporate a first sensor for detecting first parameter of the electronics module, and a second sensor for detecting a second parameter of the electronics module.

If the first parameter of the electronics module changes as indicated by the first sensor, then the electronics module may output a disabling signal via the connection for an attached field device.

If the second parameter of the electronics module changes as indicated by the second sensor, then the electronics module may output a disabling signal via the connection for an attached field device.

The first parameter may be an altitude of the electronics module. The second parameter may be a direction of the electronics module.

Any publication or patent document that may be noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A disabling system for a field device, comprising:
a first sensor;
an electronics module connected to the first sensor; and
a second sensor connected to the electronics module; and
wherein:
the first sensor detects a vibration of a field device;
the second sensor detects a direction or altitude of the field device;
a vibration exceeding a predetermined magnitude detected by the first sensor results in the electronics module activating a disabling function of the field device, which results in a shutdown of the field device;
a change in direction or altitude detected by the second sensor of the field sensor results in the electronics module engaging the disabling function of the field device, which results in a shutdown of the field device; and
a design of the electronics module prevents rehabilitation of the field device even if the field device is returned to a direction that is the same as the direction that the field device had before any change in direction, an altitude that is the same as the altitude that the field device had before any change in altitude, and a vibration that does not exceed the predetermined magnitude.

2. The disabling system for a field device of claim 1, wherein the design of the electronics permits a signal to be sent or reflected by a handheld component to reverse the disabling of the field device and revive the field device to an operational state that it had prior to a change in direction, altitude or a vibration without exceeding a predetermined magnitude.

3. The disabling system for a field device of claim 2, wherein when a reversal of the disabling of the field device occurs, the field device can be revived in a direction different than a previous direction, or an altitude different than a previous altitude that the field device had prior to a change of direction or altitude.

4. The disabling system for a field device of claim 3, wherein a magnitude of vibration, altitude or direction of the field device at the time of revival is stored and used as a reference for detecting another direction or altitude of the field device or a magnitude of vibration leading to a disabling of the field device, which results in a shutdown of the field device.

5. The disabling system for a field device of claim 1, wherein the design of the electronics module permits a signal to be sent or reflected by a portable component if in an environment of wireless connectivity selected from a group comprising Wi-Fi, Bluetooth, GPS, and cellular networks, to remotely unlock or reverse the disabling of the field device and revive the field device to an operational state that it had prior to the change in magnitude of vibration, altitude or direction of the field device.

6. The disabling system for a field device of claim 1 wherein the design of the electronics module permits the field device to transmit a signal that identifies itself or its location in an environment of wireless connectivity selected from a group comprising Wi-Fi, Bluetooth, GPS, and cellular networks.

\* \* \* \* \*